No. 892,972. PATENTED JULY 7, 1908.
A. V. BRYCE.
FASTENING DEVICE.
APPLICATION FILED SEPT. 16, 1907.
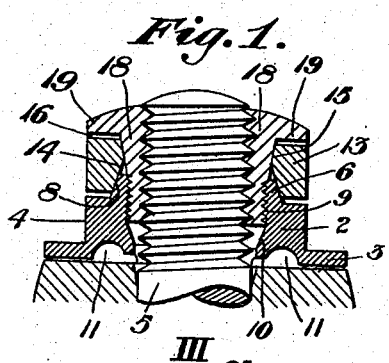
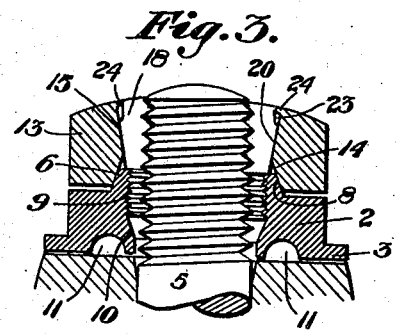
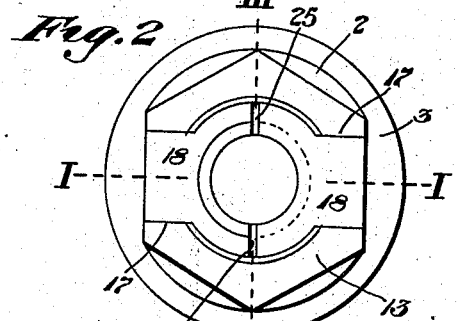
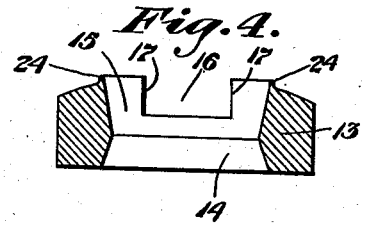
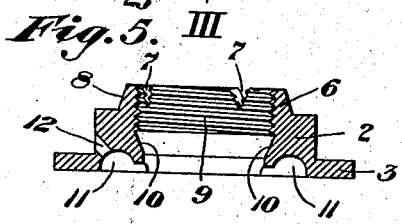
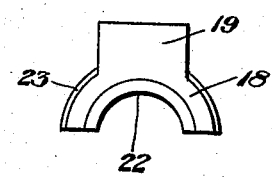
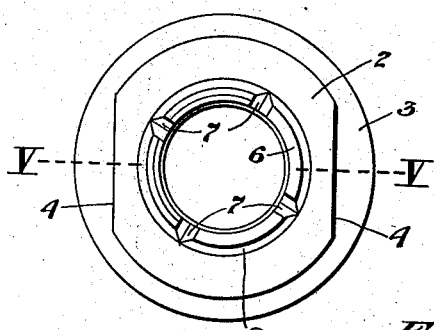
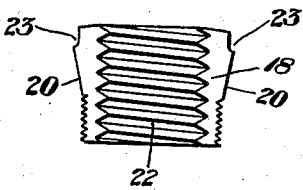
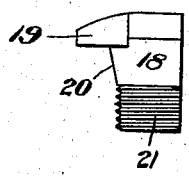
Witnesses:
Chas. L. Stepley.
Fred Staul.
Inventor:
Andrew V. Bryce
by C. M. Clarke
his attorney

UNITED STATES PATENT OFFICE.

ANDREW V. BRYCE, OF PITTSBURG, PENNSYLVANIA, ASSIGNOR TO INTER-STATE MANUFACTURING COMPANY, OF PITTSBURG, PENNSYLVANIA, A CORPORATION OF ARIZONA TERRITORY.

FASTENING DEVICE.

No. 892,972.  Specification of Letters Patent.  Patented July 7, 1908.

Application filed September 16, 1907. Serial No. 393,073.

*To all whom it may concern:*

Be it known that I, ANDREW V. BRYCE, a citizen of the United States, residing at Pittsburg, in the county of Allegheny and State of Pennsylvania, have invented certain new and useful Improvements in Fastening Devices, of which the following is a specification, reference being had therein to the accompanying drawing.

My invention consists of an improvement in locking nuts for bolts, etc. of that class wherein a turning nut is provided with separable internally threaded tapered bushings adapted to engage the bolt under turning action of the nut and to gradually tighten upon it so as to prevent loosening.

The present invention is particularly designed to provide a construction adapted for use on the ends of vehicle axles wherein a flanged nut or collar is employed, or for any other similar purpose or use, and is so constructed as to provide for the retention or storing of grease or other similar lubricant, and for the purpose of positively holding the flanged retaining device on the end of the axle in fixed position independent of the hub but close to it to facilitate the turning of the wheel.

Referring to the drawings: Figure 1 is a vertical sectional view showing the device secured upon the end of an axle, indicated by the section line I. I. of Fig. 2. Fig. 2 is a plan view of Fig. 1. Fig. 3 is a sectional view similar to Fig. 1 at right angles thereto indicated by the section line III. III. of Fig. 2. Fig. 4 is a cross sectional detail view of the outer nut detached. Fig. 5 is a similar sectional view of the inner flanged nut detached, indicated by the line V. V. of Fig. 6. Fig. 6 is a plan view of the inner flanged nut. Figs. 7, 8, and 9 are detail views of one of the bushings detached.

2 is the inner nut provided with the base flange 3 of any suitable size adapted to be located on the end of the axle closely adjacent to the end of the hub as shown in Figs. 1 and 3, the body portion of the nut extending outwardly beyond said flange and being provided at opposite sides with the flat turning faces 4 for attachment of a wrench. The middle portion of nut 2 is open for clearance of the threaded terminal 5 of the axle and is provided with an annular outwardly extending exteriorly tapered wedge extension 6 provided at intervals with longitudinal cuts or divisions 7 of any suitable form so as to permit of a certain amount of resiliency, whereby the extension 6 may be forced inwardly in the manner hereinafter described. The outer tapered faces 8 of said extension 6 is smooth as shown, while the inner annular walls are vertical and provided with the screw threads 9 adapted to engage the correspondingly threaded exterior terminals of the bolt clamping bushings. At or adjacent to its inner base portion the inner nut 2 is provided with an inwardly tapering annular wall 10 adapted to engage the inner terminals of the bushings and to wedge them inwardly against the bolt as the bushings are screwed down.

The under face of the inner nut 2, or the inner face of flange 3, is flat in order to make substantially abutting contact against the end of the hub with sufficient clearance to prevent friction, or against any element with which the axle, or bolt if used with a bolt, is incorporated. The flange 3, being circular, completely covers and protects the end of the hub and the bearings therein.

For the purpose of providing a reservoir for the lubricant the inner face of the flanged nut 2 is annularly recessed as shown at 11, and one or more openings 12 may be made through the body portion of the nut 2 for the purpose of supplying lubricant, which openings may be plugged in any suitable way. The advantage of this construction is that a separate annular cavity is provided for retaining the lubricant which may be renewed from time to time, or which will serve to collect and store any surplus lubricant, thereby preventing waste.

13 is the upper nut, of any suitable form as square or hexagon, provided in its lower interior portion with a cavity having outwardly diverging tapering annular faces 14, corresponding to the degree of tapered faces 8 of the inner nut, adapted to wedge the sectional tapered extension 6 inwardly around the bushings when the nut 13 and the assembled bushings are turned. The outer interior central cavity of nut 13 is confined within oppositely flaring tapered walls 15 as clearly shown in Fig. 4, conforming to the same degree of taper as that of the bushings.

Outer nut 13 is provided at opposite sides of its upper face with recesses 16 cut or formed in any suitable manner below the general outer surface of the nut and adapted to receive and engage by the shoulders 17, 17, the laterally projecting lug of each separate bushing at opposite sides, as clearly shown.

18, 18, are the bushings which as shown are double, provided with the said lugs 19 having the downwardly tapered exterior faces 20 terminating in straight threads 21 adapted to be engaged by threads 9 of the inner nut 2, and also provided with the main interior threads 22 for engagement with the threads of the axle terminal 5, as clearly shown in Figs: 1 and 3.

The outer portions of bushings 18 are recessed as at 23 so as to provide clearance for an inwardly projecting fin or lip 24 arranged around the opposite sides of upper nut 13 extending inwardly over the recesses 23 as shown so as to prevent disengagement of the parts when assembled. The lip 24 is originally made in the form shown in Fig. 4 whereby the outer tapered faces 15 extend continuously to the outer side of nut 13 and after the parts are assembled these lips 24 are bent over in any suitable manner into the position shown in Fig. 3 to engage and retain the bushings as stated. The lips 24 may however be previously bent inwardly sufficiently far to engage and frictionally hold the bushings.

The bushings 18 may be made in any convenient way as by casting, with which method I have secured good results in practice, care being taken that the threads in the bushings are so arranged as to aline with each other at their terminals. For such purpose I preferably make the bushings from different patterns so that when seated within the nuts 2 and 13 their threads will form practically one continuous thread both inside and outside, being interrupted at opposite sides only by the slight intervening space 25 as clearly shown in Fig. 2. The function of such space is that as the assembled nuts are secured around the axle terminal in the desired position, and further motion being imparted to the bushing, they will be fed inwardly upon the threaded axle terminal and within nut 2 respectively by their threads and will be drawn inwardly by reason of the tapered faces 15 and 20 and also by the supplemental binding action of extension 6, wedged inwardly by tapered faces 14.

When the lower edges of the bushings make contact with the tapered walls 10 of the inner nut the wedging action will be further increased, thus tightly binding the bushings to the threaded axle terminal, and rigidly holding both nuts in position. It will be understood of course, that the degree of taper of the co-acting faces is purposely the same to insure a good bearing throughout the entire length of each co-acting element.

An especial advantage in the combination of the two nuts 2 and 13, co-acting together and in combination with the bushings 18, is that the bushings will not only be fed inwardly engaging the threaded axle terminal more tightly at each revolution, but the wedging action of extensions 6 will tend to firmly bind all of the parts tightly together against movement. When thus assembled and applied the nuts may be screwed down until they have been turned to the desired tension, whereupon the bushings will firmly grasp the axle terminal and at the same time hold the nuts in position.

Independent supplemental adjustment may be made by either nut if desired and when thus assembled and tightened the complete device will act to securely hold the flanged inner nut in proper position with relation to the hub, and disengagement or loosening will be absolutely prevented. If for any reason the parts become loose, the device may be readily adjusted by merely turning either or both nuts to take up wear.

As thus constructed the complete device constitutes a strong, efficient and durable locking nut having great strength and continuous holding power. It may be used in various adaptations and may be changed or varied in different details of construction or design or in any other features by the skilled mechanic, but all such changes are to be considered as within the scope of the following claims.

What I claim is:

1. In a self-fastening locking nut for axles, etc., the combination of an inner nut having a peripheral circularly arranged protecting base flange, an outwardly projecting body portion having turning faces, and a projecting tapered annular extension and interior threads; an outer nut having a tapered interior; and bushings having exterior and interior threads, said bushings being in turning engagement with the outer one of said nuts, substantially as set forth.

2. In a self-fastening locking nut for axles, etc., the combination of an inner nut having a base flange and an inner annular lubricant-containing cavity, an outwardly projecting body portion having turning faces, and a projecting tapered annular extension and interior threads; an outer nut having a tapered interior; and bushings having exterior and interior threads, said bushings being in turning engagement with the upper one of said nuts, substantially as set forth.

3. In a self-fastening locking nut for axles, etc., the combination of an inner nut having a base flange and an inner annular lubricant-containing cavity with a supply aperture leading therefrom to the exterior of the nut, an outwardly projecting body portion having turning faces, a projecting tapered annular extension, and interior threads: an outer nut having a tapered interior, and bushings having exterior and interior threads, said bushings being in turning engagement with the outer one of said nuts, substantially as set forth.

In testimony whereof I affix my signature in presence of two witnesses.

ANDREW V. BRYCE.

Witnesses:
    Geo. B. Bleming,
    C. M. Clarke.